Figure 1:
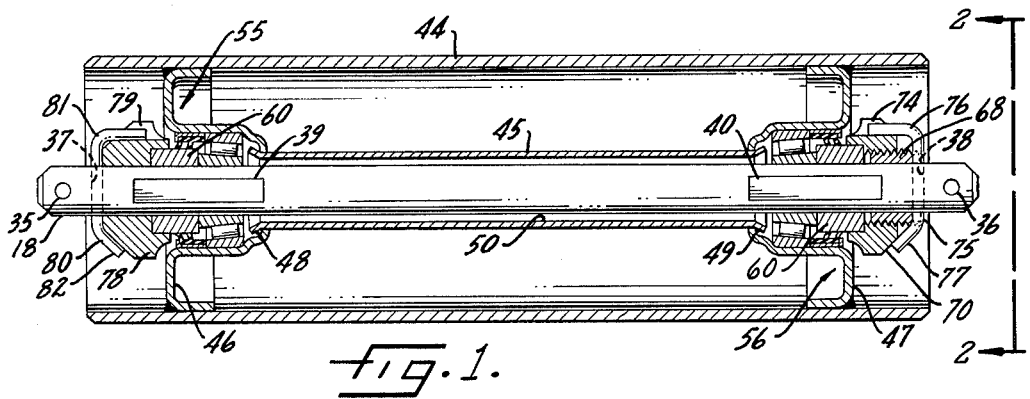

March 8, 1966   G. W. CINA ETAL   3,239,284
PRESSURE LUBRICATED ROLLER
Filed Aug. 6, 1962

INVENTORS.
GEORGE W. CINA
JOHN R. MADEIRA
BY Parker & Carter
Attorneys.

United States Patent Office 3,239,284
Patented Mar. 8, 1966

3,239,284
PRESSURE LUBRICATED ROLLER
George W. Cina, La Grange Park, and John R. Madeira, Chicago, Ill., assignors to Goodman Manufacturing Company, Chicago, Ill., a corporation of Illinois
Filed Aug. 6, 1962, Ser. No. 214,911
11 Claims. (Cl. 308—20)

This invention relates generally to idler assemblies for flexible belt conveyors and more particularly to a troughing idler assembly having an improved idler roller bearing and pressure lubrication system.

Idler assemblies of the type illustrated in the Craggs et al. patent, No. 2,773,257, are generally serially interconnected for flexing movement in a generally vertical plane with respect to one another to form a flexible support for a conveyor belt. The rollers might be in general axial alignment or offset with respect to one another. In an assembly of the type in which the rollers are in general axial alignment, each might be connected to an adjacent roller by an ordinary chain link means or they might, in the alternative, be connected together by subframe dead shaft mounting of the type shown in co-pending application, Serial No. 838,206, filed September 4, 1959, now Patent Number 3,083,815, entitled "Troughing Idler Assembly for Low Clearance Installations," assigned to the assignee of this application. These and other constructions are utilized for serially interconnecting idler rollers in a troughing idler assembly.

Prior to the development and present wide use of troughing idler assemblies in flexible belt conveyor systems, the bearing assemblies normally supporting each roller for rotation about its associated dead shaft were easily adjusted and lubricated, since access to the ends of individual rollers and shafts was not impeded by interconnected adjoining shafts and idler rollers. In the old rigid frame conveyors the roller shaft ends were exposed and it was a simple matter to drill a hole along the longitudinal axis of the shaft, plug it with a grease fitting and force lubricant under pressure to the shaft-supporting roller bearing. Bearing races were simply adjusted by merely tightening a threaded adjusting nut on the shaft.

Flexible idler assemblies cannot normally be lubricated or their bearings adjusted in such simple manner due to their serially interconnected construction. In some instances pre-lubricated and sealed bearing assemblies have been employed to overcome this problem. In certain operations, however, pressure lubricated bearings are desirable due to their greater dependability and general lower cost.

Accordingly, it is a primary object of this invention to provide an improved pressure lubrication and bearing system for rollers in a troughing idler assembly.

Another object is to provide a pressure lubrication system for serially interconnected idler rollers which is easily accessible for maintenance.

Still another object is to provide a bearing assembly for serially interconnected idler rollers which is easily assembled and permits simple adjustment while in assembled relation.

Yet another object is to provide an improved bearing pressure adjusting means for serially interconnected idler rollers.

Another object is to provide a pressure lubrication system for an idler assembly of the afore-described character which is simple and inexpensive in construction.

Still another object is to provide a pressure lubrication system of the afore-described character which includes an extensive lubricant reservoir.

These and other objects of this invention will be found in the following specification and claims wherein like reference numerals identify like parts throughout.

Figure 3:
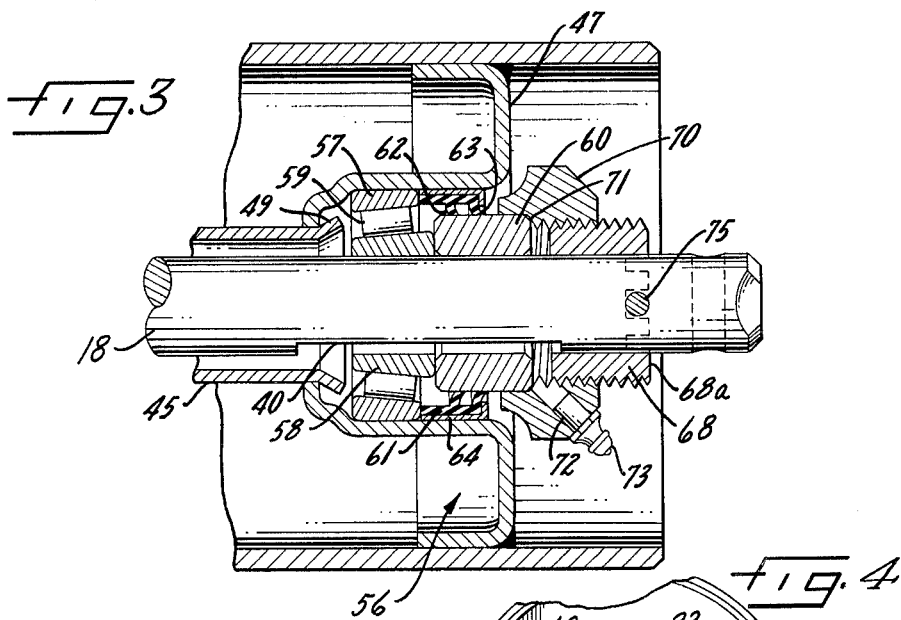
Figure 2:
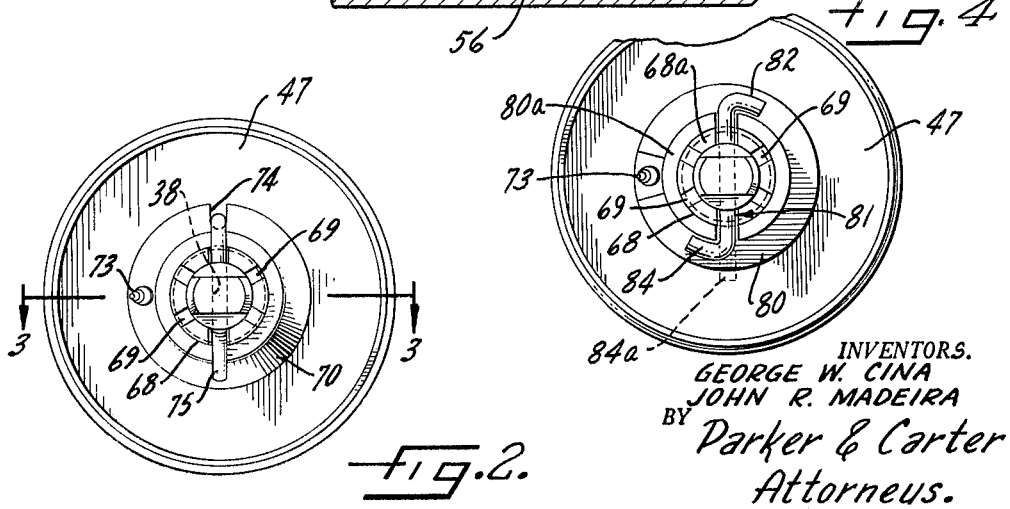

The invention is illustrated more or less diagrammatically in the accompanying drawings wherein:
FIGURE 1 is a partial section of an idler roller,
FIGURE 2 is an enlargement of the view taken along line 2—2 of FIGURE 1,
FIGURE 3 is a view taken along line 3—3 of FIGURE 2, and
FIGURE 4 is a view similar to FIGURE 2 showing an alternate embodiment of the invention.

Dead shaft 18 supports each of the idler rollers in the manner shown in FIGURE 1. Apertures 35 and 36 extend through the shaft 18 adjacent opposite ends thereof in generally horizontal relationship. In operation, horizontally extending pivot pins, here omitted for clarity, extend through the apertures 35 and 36. Generally vertically oriented apertures 37 and 38 extend through the shaft 18 immediately adjacent apertures 35 and 36 and inside thereof on the shaft 18. Lubricant channels or recesses 39 and 40 are machined into one side of the shaft 18 and extend for a predetermined length therealong. The channels 39 and 40 are situated as shown for reasons which will be more fully explained in the discussion of the use and operation of this invention.

As seen in FIGURE 1, the roller is composed of an outer shell 44 and an inner tube 45 joined at their adjacent ends by flanged cup-like heads 46 and 47. Each end of the tube 45 is itself flanged, as at 48 and 49, to provide a lubricant-tight seal between the heads 46 and 47 and tube 45. The tube 45 has a slightly larger diameter than the shaft 18 and consequently an annular area 50, which is utilized as a lubricant storage area, is formed between the tube 45 and the shaft 18.

A nonadjustable bearing means 55 supports one end of each roller for rotation about its corresponding dead shaft. A similar bearing means 56 supports the opposite end of a roller for rotation about the dead shaft. The bearing means 56 differs from that shown generally at 55 in that it is adjustable in a manner which will be hereinafter described.

As will be best seen in FIGURE 3, the bearing means 56 includes an outer bearing race 57 snugly seated in the cup-shaped element 47. An inner bearing race 58 is slidably mounted on the shaft 18 in generally radial alignment with the outer bearing race 57 and a series of conventional roller bearings 59 are positioned between opposed surfaces of the inner and outer bearing races. A spacer element 60 is slidably mounted on the shaft 18 adjacent the inner bearing race 58 and engages the inner bearing race in abutting relationship. Spacer 60 functions as a force transmission member in a bearing pressure adjustment means as will more fully appear hereinafter. A lubricant seal means 61 of flexible material having generally radially inwardly extending lips 62 and 63 engaging the outer surface of the spacer element is seated in a seal retaining member 64 snugly received in the cup-shaped element 47. An externally threaded sleeve 68 having a series of transversely disposed, peripherally spaced notches 69 on its outer end is slidably received on the end of the shaft such that a pair of said notches 69 can be readily aligned with the aperture 38. An internally threaded adjusting collar 70 is threaded onto the externally threaded sleeve 68 and into abutting relationship with the spacer element 60, as at 71. The collar 70 and sleeve 68 together form a force applying means which are capable of applying a force against the spacer 60, the collar, sleeve and spacer thereby functioning as a bearing pressure adjustment means which acts on the bearing means. The collar 70 has an aperture 72 extending therethrough and a lubricant fitting 73 is held therein by a compression fit. A groove 74, as is best seen in FIGURE 2, is formed in the periphery of collar 70 and extends longitudinally of the shaft 18. The groove 74 and lubricant fitting 73 are positioned such that they are 90 degrees removed from each other around the periphery of the collar 70. This arrangement is significantly important for reasons which will be more fully explained. A pin 75 extends through aperture 38 and a pair of the notches 69 in sleeve 68 and is bent, as at 76, so as to lie in groove 74 and lock shaft 18, sleeve 68 and collar 70 relative to each other. The other end of the pin 75 can be crimped or bent, as at 77, to prevent the pin from being inadvertently or accidentally removed.

The bearing means 55 is identical in construction to bearing means 56 with but few exceptions. These few exceptions are centered about the adjusting collar 78, as seen in FIGURE 1. The collar 78 abuts a spacer 60 slidably received on the shaft adjacent to it in the same manner in which the collar 70 abuts spacer 60 in assembly 56. Since the bearing means 55 is not adjustable, however, no externally threaded sleeve 68 is provided to support the collar 78 on the shaft 18 and the collar is merely slidably received on the end of the shaft in the same manner as spacer 60. A groove 79 is formed in the periphery of collar 78 and a pin 80 extends through aperture 37 in the end of the shaft and is bent at generally right angles to lie in the groove 79, as at 81, and lock the shaft 18 and collar 78 relative to each other. The other end of pin 80 might also be crimped or bent, as at 82, to prevent accidental removal. Although not shown in FIGURE 1, a lubricant fitting, similar to the fitting 73, extends through the collar 78 and communicates with the outer end of lubricant passage 39. As in the bearing means 56, the groove 79 is spaced approximately 90 degrees from the lubricant fitting (not shown) around the periphery of the collar 78.

The modified arrangement of FIGURE 4 may be used in either bearing means 56, or bearing means 55 and 56. In this instance collar 80 is circumferentially smooth, as contrasted to collar 70 in which groove 74 is formed, and terminates in a peripherally smooth hub portion 80a. The hub portion extends outwardly to a point just short of, or, preferably, flush with the end face 68a of sleeve 68. A slightly different pin 81 is used. Here the upper end 82 of the pin is curved to lie in the plane of the circumference of sleeve 68 and hub portion 80a, and the lower end 84 is similarly curved. Insofar as possible the inside of the curved ends follow the periphery of hub portion 80a. The ends may be curved in the same or opposite directions.

The use and operation of this invention are as follows:

Establishing initial bearing pressure in the bearing means 55 and 56 and maintaining generally proper adjustment in them throughout the service life of the individual rollers is a simple and time-saving operation with the assembly embodying this invention. To initially establish proper pressure the collar 70 is turned on threaded sleeve 68 such that it imposes pressure on spacer element 60 which in turn determines the position of inner bearing race 58. The threaded sleeve 68 functions as an anchor member, and carries the collar 70 which is longitudinally movable into force applying relationship to spacer 60. Since the bearing race 58 of bearing assembly 55 is also slidable on shaft 18, bearing pressure therein is adjusted simultaneously. The series of aligned notches 69 in the externally threaded sleeve 68 permit it to be keyed to shaft 18 and thereby fixed against rotational and longitudinal movement relative thereto. The threaded relationship of sleeve 68 and collar 70 is established such that substantially proper bearing pressure is imposed when the groove 74 is in alignment with pin 75 extending through aperture 38. The key can be bent, as is shown at 76 and 77 to block the collar in properly adjusted position.

When the foregoing relationship has been established in the bearing assembly 56, it will be seen that lubricant fitting 73 which is turned 90 degrees from groove 74, extends generally horizontally for easy access by maintenance personnel. In addition, lubricant fitting 73 and aperture 72 are in alignment with lubricant channel or recess 40. As will additionally be seen, the sleeve 68, collar 70 and spacer element 71 form, in conjunction with the recess 40, lubricant transmission path means to the inner end of the bearing means. The relationship between the lubricant fitting (not shown) in bearing means 55 and the lubricant passage 39 has been initially established in a manner identical to that described in bearing means 56. In bearing means 55, however, the lubricant fitting extends through the collar 78 into direct communication with the lubricant channel or recess 39 and consequently no spacing is required between the spacer element 60 and the collar 78, as will readily be seen in FIGURE 1.

When lubricant under pressure is pumped through lubricant fitting 73 and aperture 72 into lubricant passage 40 and thence into the reservoir 50 between the shaft 18 and tube 45, the reservoir quickly fills to capacity and lubricant is forced out between the roller bearings 59 and past the lips 62 and 63 of the flexible retarding seal 61. Since the reservoir is in communication with both bearing means 55 and 56, this occurs at both ends of the roller assembly. However, lubricant can also be injected through the fitting (not shown) on collar 79 in bearing means 55. When lubricant is forced out past the flexible lips 62 and 63 of the seals 61 in each of the bearing means, it indicates to the maintenance personnel that the bearing structures and lubricant reservoir are filled to the maximum with lubricant and ready for prolonged operation. By injecting excessive lubricant into the system, accumulated dirt and other foreign matter may be flushed out past the seals.

In the FIGURE 4 arrangement, pin 81 which preferably has end 82 curved as shown and the opposite end extending linearly outwardly therefrom as indicated at 84a is dropped through the aligned apertures. The lower end is then curved in the plane of the circumference of sleeve 68 and hub portion 80a to form end 84, as shown in solid lines.

This arrangement has the additional advantages of eliminating the formation of a notch in collar 80, and reduces the possibility of imposing additional stress on the bearing since the crimping force is exerted in a direction generally perpendicular to the shaft at a location remote from the bearing, rather than against the bearing. This will result, under some conditions, in prolonged life of the pin.

A pressure lubricated bearing assembly has been shown which permits easy and rapid adjustment of bearing pressure and insures prolonged lubrication of the bearings supporting each roller assembly. Each bearing assembly is constructed such that easy access to the lubricant fittings may be had without special lubrication equipment.

Although preferred and alternative embodiments of the invention have been described in detail, it is intended, that the description be taken as illustrative only, and not definitive, and that the scope of the invention be limited only by the appended claims.

We claim:

1. In a roller assembly of the type in which a roller is supported concentrically about a shaft,
   bearing means disposed between the shaft and the roller,
   bearing pressure adjustment means carried by the shaft in force applying relationship to the bearing means, and
   means forming a lubricant transmission path extending from the bearing pressure adjustment means to the inner end of the bearing means,
   said lubricant transmission path forming means defining a lubricant transmission path located in the periphery of the shaft.

2. The assembly of claim 1 further including flexible seal means between the roller and the bearing pressure adjustment means, said flexible seal means being effective to enable lubricant which has passed along the lubricant transmission path to escape from the system.

3. The assembly of claim 1 further characterized in that the bearing pressure adjustment means includes a force transmission member located outwardly from the bearing means, said member being of a lesser length than that portion of the peripherally located lubricant transmission path disposed outwardly from the bearing means, and force applying means effective to exert an inwardly directed force against the force transmission member and thereby against the bearing means.

4. The assembly of claim 3 further characterized in that the force applying means includes an anchor member, a longitudinally movable member carried by the anchor member and movable into force applying relationship to the force transmission member, and means for fixing the anchor member against rotation and longitudinal movement with respect to the shaft.

5. In roller assembly of the type in which a roller is supported concentrically about a shaft, bearing means disposed between each end of the shaft and the roller, bearing pressure adjustment means carried by the shaft in force applying relationship to at least one of the bearing means, means forming a lubricant transmission path extending from the bearing pressure adjustment means to the inner end of each bearing means, said lubricant transmission path forming means defining a lubricant transmission path located in the periphery of the shaft, and structure defining a lubricant reservoir located entirely exteriorly of the shaft and communicable with the bearing means at each end of the shaft whereby lubricant entering the roller assembly at one bearing means may exit at the other bearing means.

6. In an idler roller assembly having a dead shaft and a roller concentric therewith, a pressure lubricated adjustable bearing assembly comprising a pressure adjustable bearing mounted on said shaft and supporting said roller for rotation thereabout, a longitudinally extending recess in said shaft communicating with said bearing, slidably mounted spacer means on said shaft abutting said bearing, an externally threaded sleeve means slidable on said shaft and adapted to be fixed relative thereto, internally threaded collar means threaded on said sleeve means and bearing against said spacer means so as to adjustably exert pressure on said spacer means and consequently on said bearing; and lubrication means on said collar having access to said recess so as to permit lubricant to be delivered under pressure to said bearing.

7. The assembly of claim 6 further characterized in that said shaft has an aperture extending transversely therethrough, said sleeve having a notch means thereon adapted to be aligned with said aperture and pin means removably insertable in said aperture and extending through said notch means so as to fix said sleeve relative to said shaft.

8. The assembly of claim 6 further characterized in that said shaft has an aperture extending transversely therethrough, said collar means having a groove thereon adapted to be aligned with said aperture and pin means removably insertable in said aperture and extending into said groove means to lock said collar against rotation relative to said shaft.

9. In an idler roller assembly having a dead shaft and a roller concentric therewith, a pressure lubricated adjustable bearing assembly comprising a pressure adjustable bearing mounted on said shaft and supporting said roller for rotation thereabout, a longitudinally extending recess on the surface of said shaft communicating with said bearing, slidably mounted spacer means on said shaft abutting said bearing, an externally threaded sleeve means slidable on said shaft and having a notch means thereon, a transversely extending aperture in said shaft, said notch means adapted to be aligned with said aperture, internally threaded collar means threaded on said sleeve means and having a groove thereon adapted to be aligned with said notch and said aperture, said internally threaded collar means bearing against said spacer means so as to adjustably apply pressure thereto and consequently to said adjustable bearing, pin means extending into said aperture, said notch and said groove to lock said sleeve and said collar in pressure adjusted relation relative to said shaft and said bearing and a lubricant fitting means on said collar means having access to said recess to deliver lubricant under pressure to said bearing.

10. In an idler roller assembly having a dead shaft and a roller concentric therewith, a pressure lubricated adjustable bearing assembly comprising a pressure adjustable bearing mounted on said shaft and supporting said roller for rotation thereabout, a longitudinally extending recess in said shaft communicating with said bearing, slidably mounted spacer means on said shaft abutting said bearing, an externally threaded sleeve means slidable on said shaft and adapted to be fixed relative thereto, internally threaded collar means threaded on said sleeve means and bearing against said spacer means so as to adjustably exert pressure thereon and consequently on said bearing, said spacer means and said sleeve means being separated by a gap having access to said recess and a lubricant port in said collar having access to said gap so as to permit lubricant to be delivered under pressure through said gap and said recess to said bearing.

11. In an idler roller assembly having a dead shaft and a roller concentric therewith, a pressure lubricated adjustable bearing assembly comprising a pressure adjustable bearing mounted on said shaft and supporting said roller for rotation thereabout, a longitudinally extending recess on the surface of said shaft communicating with said bearing, slidably mounted spacer means on said shaft abutting said bearing, an externally threaded sleeve means slidable on said shaft and adapted to be fixed relative thereto, internally threaded collar means threaded on said sleeve means and bearing against said spacer means so as to adjustably exert pressure thereon and consequently on said bearing, said spacer means and sleeve means being separated by a gap having access to said recess, a lubricant port on said collar having access to said gap so as to permit lubricant to be delivered under pressure to said bearing and resilient lubricant seal means extending between said roller means and said spacer means tending to prevent said lubricant from flowing out of said bearing.

References Cited by the Examiner

UNITED STATES PATENTS

| 1,503,920 | 8/1924 | Schneebeli | 308—190 |
| 1,748,131 | 2/1930 | Johnson | 308—207 |
| 1,921,445 | 8/1933 | Van Derhoef | 308—20 |

DON A. WAITE, *Primary Examiner.*

ROBERT C. RIORDON, *Examiner.*